US012354517B2

(12) United States Patent
Chen

(10) Patent No.: US 12,354,517 B2
(45) Date of Patent: Jul. 8, 2025

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: Zhixiang Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,450

(22) PCT Filed: Dec. 24, 2021

(86) PCT No.: PCT/CN2021/141268
§ 371 (c)(1),
(2) Date: Jun. 29, 2023

(87) PCT Pub. No.: WO2023/115549
PCT Pub. Date: Jun. 29, 2023

(65) Prior Publication Data

US 2024/0046845 A1 Feb. 8, 2024

(30) Foreign Application Priority Data

Dec. 21, 2021 (CN) ......................... 202111571057.3

(51) Int. Cl.
*G09G 3/20* (2006.01)
*G09G 3/00* (2006.01)

(52) U.S. Cl.
CPC ........... *G09G 3/2092* (2013.01); *G09G 3/006* (2013.01); *G09G 2300/0408* (2013.01);
(Continued)

(58) Field of Classification Search
CPC ................. G09G 3/2092; G09G 3/006; G09G 2300/0408; G09G 2320/02;
(Continued)

(56) References Cited

U.S. PATENT DOCUMENTS 6,111,558 A * 8/2000 Jeung ................ G02F 1/136259 345/204
8,004,480 B2 * 8/2011 Kim ..................... G09G 3/3291 345/82
(Continued)

FOREIGN PATENT DOCUMENTS

CN 101038376 A 9/2007
CN 101408683 A 4/2009
(Continued)

OTHER PUBLICATIONS

International Search Report in International application No. PCT/CN2021/141268, mailed on Jul. 27, 2022.
(Continued)

*Primary Examiner* — Jose R Soto Lopez
(74) *Attorney, Agent, or Firm* — PV IP PC; Wei Te Chung

(57) ABSTRACT

A display panel and a display device are provided. In the display panel, a plurality of scan lines are disposed in a display area and extended to the non-display area. A GOA circuit and a plurality of signal transmission lines are disposed in the non-display area. The GOA circuit includes multi-level cascaded GOA units. Each of GOA units is electrically connected with at least one scan line through corresponding signal transmission line. A repair line is disposed between the GOA circuit and the display area and extended along the first direction. The repair line crosses the scan line or the signal transmission line and is arranged in different layers.

20 Claims, 7 Drawing Sheets

(52) U.S. Cl.
CPC ..... *G09G 2320/02* (2013.01); *G09G 2330/08* (2013.01); *G09G 2330/12* (2013.01)

(58) Field of Classification Search
CPC ........... G09G 2330/08; G09G 2330/12; G09G 3/3266; G09G 3/3677; G09G 2310/0267; G09G 3/20; G09G 2300/0426; G09F 9/30
See application file for complete search history.

(56) References Cited

U.S. PATENT DOCUMENTS

| | | | | |
|---|---|---|---|---|
| 11,928,996 | B2* | 3/2024 | Chen | G11C 19/28 |
| 2002/0047818 | A1* | 4/2002 | Yamamoto | G09G 3/3648 345/87 |
| 2005/0162363 | A1* | 7/2005 | Kim | G09G 3/3655 345/92 |
| 2006/0001638 | A1* | 1/2006 | Jeon | G09G 3/3677 345/100 |
| 2006/0056267 | A1* | 3/2006 | Kim | G09G 3/3677 365/230.06 |
| 2007/0164972 | A1* | 7/2007 | Chang | G09G 3/3677 345/100 |
| 2009/0033822 | A1* | 2/2009 | Chung | G09G 3/3611 349/54 |
| 2010/0001941 | A1* | 1/2010 | Shin | G09G 3/3677 345/98 |
| 2010/0006838 | A1* | 1/2010 | Yoshida | H10K 71/70 257/E23.01 |
| 2011/0018846 | A1* | 1/2011 | Hu | G09G 3/3648 345/204 |
| 2012/0092579 | A1* | 4/2012 | Liu | G09G 3/20 349/55 |
| 2012/0127559 | A1* | 5/2012 | Van Der Plas | G09G 3/346 977/932 |
| 2012/0327057 | A1* | 12/2012 | Sakamoto | G11C 19/184 345/211 |
| 2013/0147779 | A1* | 6/2013 | Ochiai | G02F 1/1345 345/211 |
| 2013/0307833 | A1* | 11/2013 | Lee | G09G 3/3225 345/211 |
| 2014/0119490 | A1* | 5/2014 | Yang | G11C 19/28 377/64 |
| 2014/0125648 | A1* | 5/2014 | Chung | G09G 3/3677 345/213 |
| 2015/0042550 | A1 | 2/2015 | Wang et al. | |
| 2015/0108437 | A1* | 4/2015 | Cho | G09G 3/3233 257/40 |
| 2015/0123136 | A1* | 5/2015 | Kim | G02F 1/136204 438/151 |
| 2015/0130787 | A1* | 5/2015 | Chung | G09G 3/3225 345/76 |
| 2015/0138171 | A1* | 5/2015 | Kim | G09G 3/3233 345/82 |
| 2015/0187810 | A1* | 7/2015 | Lee | H10K 50/841 257/40 |
| 2015/0294618 | A1* | 10/2015 | Park | G09G 3/3291 345/78 |
| 2015/0325158 | A1* | 11/2015 | Shao | G09G 3/006 324/750.3 |
| 2015/0348466 | A1* | 12/2015 | Park | G09G 3/3233 345/82 |
| 2015/0379908 | A1* | 12/2015 | Kim | G09G 3/006 345/84 |
| 2016/0117965 | A1* | 4/2016 | Lee | G02F 1/136286 345/209 |
| 2016/0189593 | A1* | 6/2016 | Lee | G09G 3/3233 438/4 |
| 2016/0189794 | A1* | 6/2016 | Lou | G09G 3/3266 345/100 |
| 2016/0342050 | A1* | 11/2016 | Wang | G01R 31/50 |
| 2017/0053591 | A1* | 2/2017 | Seo | G09G 3/3225 |
| 2017/0200409 | A1* | 7/2017 | Zhao | G09G 3/20 |
| 2017/0343868 | A1* | 11/2017 | Kim | H10D 86/411 |
| 2018/0045983 | A1* | 2/2018 | Kim | G02F 1/29 |
| 2018/0061339 | A1* | 3/2018 | Long | G09G 3/3614 |
| 2018/0203319 | A1* | 7/2018 | Yamazaki | G02F 1/133514 |
| 2018/0301103 | A1* | 10/2018 | Li | G02F 1/136259 |
| 2019/0019444 | A1* | 1/2019 | Jo | H10K 59/131 |
| 2019/0057658 | A1* | 2/2019 | Nie | G09G 3/3266 |
| 2020/0035162 | A1* | 1/2020 | In | G09G 3/3266 |
| 2020/0035317 | A1* | 1/2020 | Feng | G11C 19/287 |
| 2020/0117065 | A1* | 4/2020 | Chien | G02F 1/136286 |
| 2020/0166813 | A1* | 5/2020 | Lin | G02F 1/136259 |
| 2020/0174328 | A1* | 6/2020 | He | G02F 1/136259 |
| 2020/0225531 | A1* | 7/2020 | Lee | G02F 1/136286 |
| 2021/0056887 | A1* | 2/2021 | Lee | G09G 3/2092 |
| 2021/0057449 | A1* | 2/2021 | Wang | H10D 86/441 |
| 2021/0201818 | A1* | 7/2021 | Jang | H10D 86/60 |
| 2021/0335195 | A1* | 10/2021 | Xian | G09G 3/3674 |
| 2021/0366429 | A1* | 11/2021 | Shin | G09G 3/3677 |
| 2022/0068211 | A1* | 3/2022 | Jeong | H10K 59/131 |
| 2022/0140037 | A1* | 5/2022 | Park | H10K 59/1213 257/40 |
| 2022/0366848 | A1* | 11/2022 | Huang | G09G 3/3233 |
| 2022/0406871 | A1* | 12/2022 | Yi | G02F 1/1362 |

FOREIGN PATENT DOCUMENTS

| | | | |
|---|---|---|---|
| CN | 101907790 | A | 12/2010 |
| CN | 102156366 | A | 8/2011 |
| CN | 103257496 | A | 8/2013 |
| CN | 104900212 | A | 9/2015 |
| CN | 108445684 | A | 8/2018 |
| CN | 109188815 | A | 1/2019 |
| CN | 111341758 | A | 6/2020 |
| CN | 112117286 | A | 12/2020 |
| CN | 113625495 | A | 11/2021 |
| IN | 102004335 | A | 4/2011 |
| JP | H07175085 | A | 7/1995 |

OTHER PUBLICATIONS

Written Opinion of the International Search Authority in International application No. PCT/CN2021/141268, mailed on Jul. 27, 2022.

Chinese Office Action issued in corresponding Chinese Patent Application No. 202111571057.3 dated Jul. 27, 2022, pp. 1-10.

* cited by examiner

DISPLAY PANEL AND DISPLAY DEVICE

BACKGROUND OF INVENTION

Field of Invention

The present application relates to the field of display technology, in particular to a display panel and a display device.

Description of Prior Art

In display panels, a normal display of an effective active area (AA) is jointly controlled by scan lines and data lines. The scan lines are used to transmit scan signals that controls a switch of a transistor in a pixel. The data lines transmit data signals required for the pixel display. In addition, a gate driver on array (GOA) is to integrate a gate drive circuit on the array substrate of the display panel to achieve a progressive scan driving mode, which can save the gate drive circuit, it has the advantages of reducing production costs and realizing a narrow frame design of the panel, and is used by a variety of displays.

Usually, a GOA circuit and the scan lines in the effective display area are connected by wires, but due to reasons such as manufacturing process, there will be a disconnection between the GOA circuit and the scan lines, resulting in the scan signals transmitted by the scan lines are abnormal of a certain line or several lines, causing display defects such as horizontal lines in the display screen.

SUMMARY OF INVENTION

The present application provides a display panel and a display device to solve the technical problem of poor connection between a GOA circuit and scan lines in the prior art, which leads to poor display of the display panel.

The present application provides a display panel, including a display area and a non-display area connected to the display area, wherein the display panel includes:

a plurality of scan lines disposed in the display area and extended to the non-display area, wherein the plurality of scan lines are arranged along a first direction;

a GOA circuit disposed in the non-display area, wherein the GOA circuit includes multi-stage cascaded GOA units;

a plurality of signal transmission lines disposed in the non-display area, wherein each of the GOA units is electrically connected to at least one of the scan lines through corresponding one of the signal transmission lines; and at least one repair line disposed between the GOA circuit and the display area and extended along the first direction, wherein the repair line crosses the scan lines or the signal transmission lines and is disposed in different layers.

In the present application, by setting the repair line, the scan line that transmits the scan signal abnormally can be connected to another scan line that transmits the scan signal normally to repair the horizontal line caused by the poor connection between the GOA circuit and the scan line, and improve poor display problems of the display panel, thereby improving the display quality.

Optionally, in the embodiments of the present application, the display panel further provides with a plurality of via holes, the via holes are defined in the non-display area, the signal transmission lines and the scan lines are disposed in different layers, and each of the signal transmission lines is electrically connected to corresponding scan line through the via hole; and wherein the repair line is disposed on a side of the via holes close to the display area, and the repair line crosses the scan lines and are disposed in different layers.

In the present application, the repair line is disposed on the side of the via holes close to the display area, no matter the GOA unit has a signal output problem, or the signal transmission lines has a disconnection problem, or the via hole has a poor contact problem, the scan lines with abnormal scan signal transmission can be repaired through the repair line. The wiring problems between the GOA circuit and the scan lines can be solved.

Optionally, in the embodiments of the present application, the repair line and the signal transmission lines are disposed in a same layer.

In the embodiments of the present application, the repair line and the signal transmission lines are disposed in a same layer. Therefore, the manufacturing process can be simplified, and the thickness of the display panel can be reduced.

Optionally, in the embodiments of the present application, the repair line is provided with a plurality of welding marks, and intersections of the plurality of scan lines and the repair line correspond one-to-one with the welding marks.

The embodiment can improve the connection yield of the repair line and the scan lines, and avoid damage to other film layers during laser irradiation.

Optionally, in the embodiments of the present application, a quantity of the repair line is one, a plurality of cutting marks are disposed on the repair line, and one of the cutting marks is disposed between every two adjacent welding marks.

In the present application, when the plurality of scan lines are abnormal, the repair line can be cut to realize the repair of the plurality of scan lines, which improves the utilization rate of the repair line and reduces the number of the repair line, and the wiring structure in the display panel is simplified. Furthermore, disposing the cutting marks on the repair line can improve the accuracy of cutting. When the scan lines are densely arranged, it is avoided that adjacent scan lines are cut to cause more display defects.

Optionally, in the embodiments of the present application, the display panel further provides with a plurality of via holes, the via holes are defined in the non-display area, the signal transmission lines and the scan lines are disposed in different layers, and each of the signal transmission lines is electrically connected to corresponding scan line through the via hole; and wherein the repair line is disposed on a side of the via holes away from the display area, and the repair line crosses the signal transmission lines and is disposed in different layers.

In the embodiment, the repair line is arranged on the side of the via holes away from the display area, so that the location of the repair line is more flexible.

Optionally, in the embodiments of the present application, the display panel further includes a common electrode line, the common electrode line extended along the first direction and is disposed between the GOA circuit and the via holes, and the repair line is disposed between the GOA circuit and the common electrode line;

wherein the common electrode line, the repair line and the scan lines are disposed in a same layer.

In the embodiment, the repair line is disposed between the GOA circuit and the common electrode line, which can avoid the overlap of the repair line and the common electrode line, thereby reducing display parasitic capacitance in the panel.

Optionally, in the embodiments of the present application, the display panel further includes a detection pad, a plurality of the repair line is one, and one end of the repair line is electrically connected to the detection pad.

In the embodiment, the repair line can be multiplexed as a detection line to detect a multi-level scan signal output by the GOA circuit, and then evaluate the GOA circuit.

Optionally, in the embodiments of the present application, the display panel further includes a detection pad, a plurality of the repair line is two, one end of the repair lines is electrically connected to the detection pad, and both ends of other repair line are in a floating state.

Optionally, in the embodiments of the present application, each of the signal transmission lines includes a first transmission line, a second transmission line and a third transmission line, a plurality of the first transmission lines are arranged along the first direction, and a plurality of the second transmission lines are arranged along the first direction, each of the third transmission lines is bent and extended along the first direction;

wherein, each of the first transmission lines and corresponding second transmission line is alternately arranged, and each of the first transmission lines is electrically connected to the second transmission line through corresponding third transmission line.

In the embodiment, two repair lines 30 are provided, and one of the repair lines 30 can only be used to repair the scan lines 11. The other repair line 30 is only used to detect the scan signals. In this way, crosstalk of the signal on the repair line 30 is avoided.

Optionally, in the embodiments of the present application, the GOA circuit includes a first GOA circuit and a second GOA circuit, the first GOA circuit and the second GOA circuit are disposed on opposite sides of the display area;

a plurality of the repair line is two, one of the repair lines is disposed between the first GOA circuit and the display area, and other the repair line is disposed between the second GOA circuit and the display area.

In the embodiment, the first GOA circuit and the second circuit are provided in the display panel, and a double-sided GOA drive architecture is adopted, which can effectively reduce the transmission loss of the scan signals and further improve the display image of the display panel.

Correspondingly, this application also provides a display device, the display device including a display panel and a timing controller, the timing controller is electrically connected to the display panel, wherein the display panel includes:

a plurality of scan lines disposed in the display area and extended to the non-display area, wherein the plurality of scan lines are arranged along a first direction;

a GOA circuit disposed in the non-display area, wherein the GOA circuit includes multi-stage cascaded GOA units;

a plurality of signal transmission lines disposed in the non-display area, wherein each of the GOA units is electrically connected to at least one of the scan lines through corresponding one of the signal transmission lines; and at least one repair line disposed between the GOA circuit and the display area, and extended along the first direction, wherein the repair line crosses the scan lines or the signal transmission lines and is disposed in different layers;

the timing controller used to provide control signals to the GOA circuit.

Optionally, in the embodiments of the present application, the display device further includes a circuit board, the circuit board has a detection pin, wherein the detection pin is electrically connected to the repair line.

Optionally, in the embodiments of the present application, the display panel further provides with a plurality of via holes, the via holes are defined in the non-display area, the signal transmission lines and the scan lines are disposed in different layers, and each of the signal transmission lines is electrically connected to corresponding scan line through the via hole;

wherein the repair line is disposed on a side of the via holes close to the display area, and the repair line crosses the scan lines and is disposed in different layers.

Optionally, in the embodiments of the present application, the repair line is disposed with a plurality of welding marks, and intersections of a plurality of the scan lines and the repair line correspond one-to-one with the welding marks.

Optionally, in the embodiments of the present application, a plurality of the repair line is one, a plurality of cutting marks are disposed on the repair line, and one of the cutting marks is disposed between every two adjacent welding marks.

Optionally, in the embodiments of the present application, the display panel further provides with a plurality of via holes, the via holes are defined in the non-display area, the signal transmission lines and the scan lines are disposed in different layers, and each of the signal transmission lines is electrically connected to corresponding scan line through the via hole; and wherein the repair line is disposed on a side of the via holes away from the display area, and the repair line crosses the signal transmission lines s and is disposed in different layers.

Optionally, in the embodiments of the present application, the display panel further includes a common electrode line, the common electrode line extends along the first direction and is disposed between the GOA circuit and the via holes, and the repair line is disposed between the GOA circuit and the common electrode line;

wherein, the common electrode line, the repair line and the scan lines are disposed in the same layer.

Optionally, in the embodiments of the present application, the display panel further includes a detection pad, a plurality of the repair line is one, and one end of the repair line is electrically connected to the detection pad.

Optionally, in the embodiments of the present application, the display panel further includes a detection pad, a plurality of the repair line is two, one end of the repair lines is electrically connected to the detection pad, and both ends of other the repair line are in a floating state.

Advantageous Effects

A display panel and a display device are disclosed. The display panel includes a plurality of scan lines, a GOA circuit, a plurality of signal transmission lines and at least one repair line. Wherein, the plurality of scan lines disposed in the display area and extended to the non-display area and are arranged along a first direction. The GOA circuit disposed in the non-display area, and the GOA circuit includes multi-stage cascaded GOA units. The plurality of signal transmission lines disposed in the non-display area, wherein each of the GOA units is electrically connected to at least one of the scan lines through corresponding one of the signal transmission lines. The repair line disposed between the GOA circuit and the display area, and extended along the first direction. The repair line crosses the scan lines or the signal transmission lines and is disposed in different layers. When any one of the scan lines transmits a scan signal abnormally, the present application uses the repair line to electrically connect the scan line with abnormal transmission to another scan line that transmits the scan signal normally, which can prevent problems caused by poor connection between the GOA circuit and the scan lines. The horizontal line is repaired to improve the poor display of the display panel, thereby improving the display quality.

BRIEF DESCRIPTION OF DRAWINGS

In order to more clearly illustrate the embodiments or the technical solutions of the existing art, the drawings illustrating the embodiments or the existing art will be briefly described below. The drawings in the following description merely illustrate some embodiments of the present application. Other drawings may also be obtained by those skilled in the art according to these figures without paying creative work.

DETAILED DESCRIPTION OF PREFERRED EMBODIMENTS

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

In the description of the present application, it should be understood that the terms “first” and “second” are only used for descriptive purposes and can not be understood as indicating or implying relative importance or implicitly indicating the number of indicated technical features. Thus, the features defining “first” and “second” may explicitly or implicitly include one or more of the features. Therefore, it cannot be understood as a limitation on the present application.

The present application provides a display panel and a display device, which are described in detail below. It should be noted that the order of description of the following embodiments is not a limitation of the preferred order of the embodiments of the present application.

Figure 1:
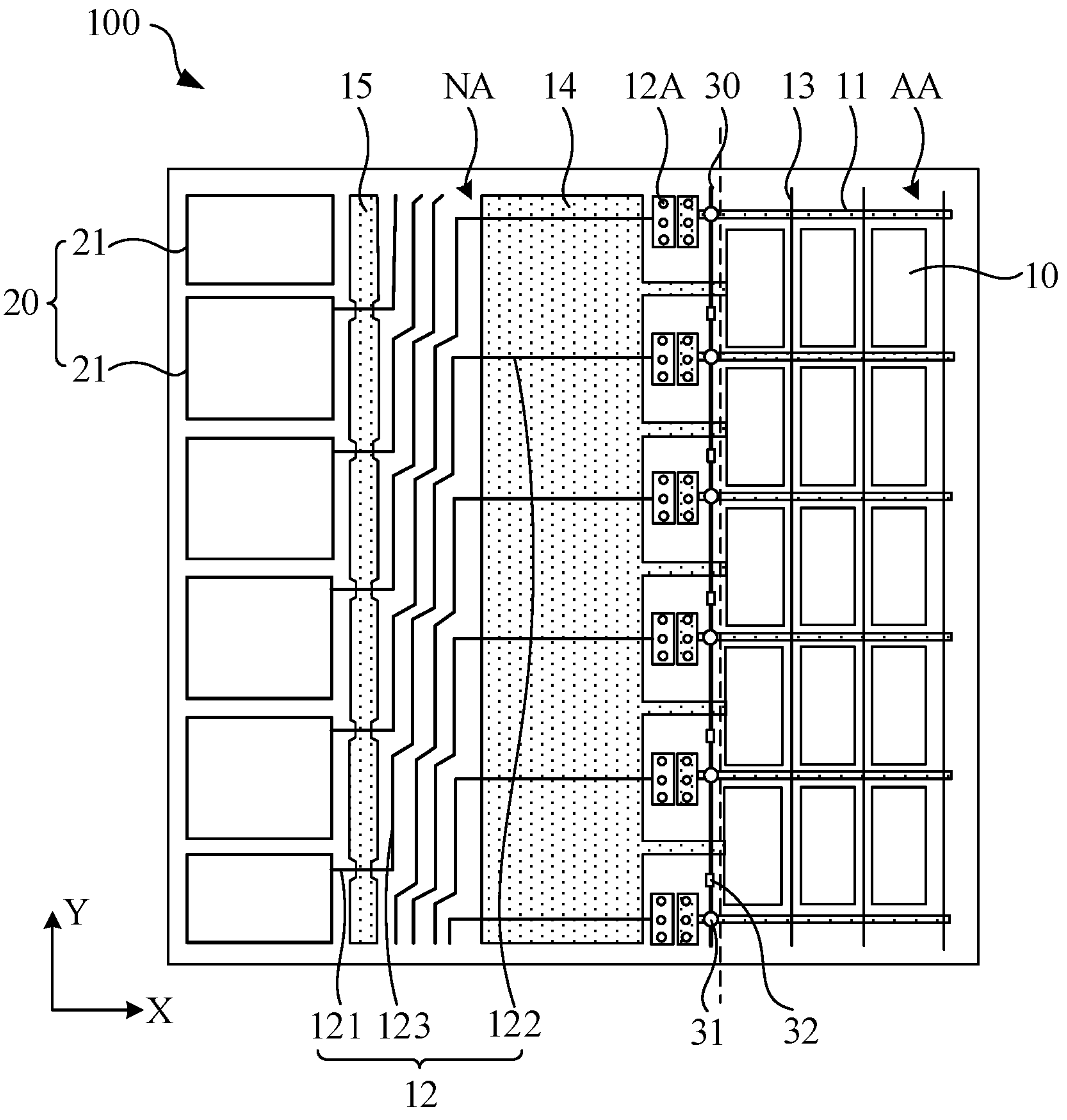
FIG. 1 is a schematic diagram of a first structure of a display panel provided by the present application.

Referring FIG. 1, FIG. 1 is a schematic diagram of a first structure of a display panel provided by the present application. In the present application, a display panel 100 including display area AA and a non-display area NA connected to the display area AA. The display panel 100 includes a plurality of scan lines 11, a GOA circuit 20, a plurality of signal transmission lines 12 and at least one repair line 30.

Wherein, the plurality of scan lines 11 disposed in the display area AA and extended to the non-display area NA. The plurality of scan lines 11 are arranged along a first direction Y Each of the scan lines 11 extended to the second direction X. The GOA circuit 20 disposed in the non-display area NA. The GOA circuit includes multi-stage cascaded GOA units 21. The GOA units 21 are arranged along the first direction Y. The plurality of signal transmission lines 12 disposed in the non-display area AA. Each of the GOA units 21 is electrically connected to at least one of the scan lines 11 through corresponding one of the signal transmission lines 12. The repair line 30 disposed between the GOA circuit 20 and the display area AA, and extended along the first direction Y. The repair line 30 crosses the scan lines 11 or the signal transmission lines 12 and is disposed in different layers. The repair line 30 is configured to electrically connect any one of the scan lines 11 that transmits scan signals abnormally to another one of the scan lines 11 that transmits scan signals normally.

Wherein, the repair line 30 can cross each of the scan lines 11 and are disposed in different layers. The repair line 30 may also cross a part of the scan lines 11 among a plurality of the scan lines 11 disposed in different layers. The signal transmission lines 12 are also the same.

In addition, the display panel 100 further includes a plurality of data lines 13. The plurality of data lines 13 are arranged along the second direction X. Each of the data lines 13 extended along the first direction Y. The scan lines 11 intersect with the data lines 13 to define a plurality of sub pixels 10. The plurality of sub-pixels 10 are arranged in an array. The sub-pixels 10 emit light under the control of scan signals transmitted by the scan lines 11 and data signals transmitted by the data lines 13. Among them, in some embodiments, at least one column of the sub-pixels 10 close to the non-display area NA is a dummy pixel.

It should be noted that the arrangement of the scan lines 11, the data lines 13 and the sub-pixels 10 in the figure is only for illustration, and cannot be understood as a limitation of the present application. For example, the display panel 100 shown in FIG. 1 adopts a one gate one data (1G1D) drive architecture. In some embodiments of the present application, the display panel 100 may also adopt a half gate two data (HG2D) drive architecture, a tri-gate drive architecture, etc., which will not be repeated here.

It should be understood that when the scan signals are transmitted between the GOA circuit 20 and the scan lines 11 through the signal transmission lines 12, the transmission of the scan signals may be interrupted or the waveform of the scan signals may be deformed due to disconnection, signal interference, poor connection and other reasons. Generally, each of the scan lines 11 controls a emit light state of one row of sub-pixels 10. Therefore, when the scan signals transmitted by one of the scan lines 11 is abnormal, the sub-pixels 10 of the corresponding line cannot emit light normally, and a horizontal line will appear in the display screen.

In this regard, the present application provides the repair line 30 between the GOA circuit 20 and the display area AA. When any one of the scan lines 11 transmits a scan signal abnormally, the repair line 30 is used to electrically connect the scan lines 11 that transmits the scan signal abnormally to another one of the scan lines 11 that transmits the scan signal normally, so that the scan lines 11 can receive the scan signal normally. Therefore, the horizontal line caused by the poor connection between the GOA circuit 20 and the scan lines 11 is repaired, so as to improve the display problem of the display panel 100 and improve the display quality.

In the present application, it can be known from the foregoing that when one of the scan lines 11 transmits the scan signal abnormally, the sub-pixels 10 in the corresponding row will display abnormalities, such as the horizontal line appear. Therefore, a state of the scan signals transmitted by the scan lines 11 can be determined according to the display screen of the display panel 100. In addition, in some embodiments of the present application, the scan signal at the output terminal of each of the GOA units 21 or the scan signal transmitted by each of the scan lines 11 may also be detected by means such as external detection. After a state of the scan signal transmitted by the scan line 11 is determined, the repair line 30 is used to repair. Of course, the present application is not limited to the above judgment method.

In the present application, when any one of scan lines 11 transmits the scan signal abnormally, the scan line 11 can be shorted with an adjacent one of the scan lines 11. For example, when a scan signal transmitted by a Nth scan line 11 is abnormal, the repair line 30 can be used to electrically connect the Nth scan line 11 and a (N−1)th scan line 11. The Nth scan line 11 and a (N+1)th scan line 11 can also be electrically connected through the repair line 30. Wherein, N is an integer greater than 1.

It should be understood that when two adjacent scan lines 11 are shorted together, the sub-pixels 10 connected to the two adjacent scan lines 11 will be charged with a same data voltage, that is, displaying the same brightness. However, two adjacent rows of sub-pixels 10 display a same picture, and a visual difference caused in the display panel 100 is not significant. Therefore, connecting the scan lines 11 that transmits the scan signal abnormally with the adjacent scan lines 11 to ensure the normal display of the display panel 100.

In the present application, the repair line 30 is provided with a plurality of welding marks 31. Intersections of the plurality of scan lines 11 and the repair line 30 correspond one-to-one with the welding marks 31. It should be understood that the repair line 30 and corresponding scan line 11 can be connected together by means of laser. The energy of the laser is very high, in order to avoid damage to other film layers, the present application provides the welding marks 31 on the repair line 30, making the intersections of the scan line 11 and the repair line 30 correspond to the welding mark 31, which can improve the accuracy of the laser. While improving the connection yield of the repair line 30 and the scan lines 11, it avoids laser damage to other film layers.

In addition, the welding marks 31 may be a protrusion or a groove provided on the repair line 30. The welding mark 31 may also be a graphic mark like "−", "+", "x" and "+" disposed on the repair line 30. This application does not specifically limit this.

In the present application, the number of the repair lines 30 can be multiple or one. The number of the repair lines 30 can be set according to factors such as the wiring space of the display panel 100 and the number of the scan lines 11. A width of the repair line 30 in the second direction X may be set according to the wiring space of the display panel 100.

Specifically, in some embodiments of the present application, a plurality of the repair line 30 is one, a plurality of cutting marks 32 are disposed on the repair line 30. One of the cutting marks 32 disposed between every two adjacent welding marks 32.

It should be understood that when the plurality of scan lines 11 transmit scan signals abnormally at a same time. In some embodiments, the plurality of scan lines 11 that abnormal may be connected to a same scan line 11 that normally transmits signals. At this time, the repair line 30 is in a state shared by the plurality of scan lines 11. However, since the sub-pixels 10 connected to the plurality of scan lines 11 display a same brightness, in order to improve the display quality, when the plurality of scan lines 11 with abnormal transmission occur, only two scan lines 11 are shorted together. At this time, since only a plurality of the repair line 30 is one, it is necessary to divide the repair line 30 into a plurality of sections.

Figure 2:
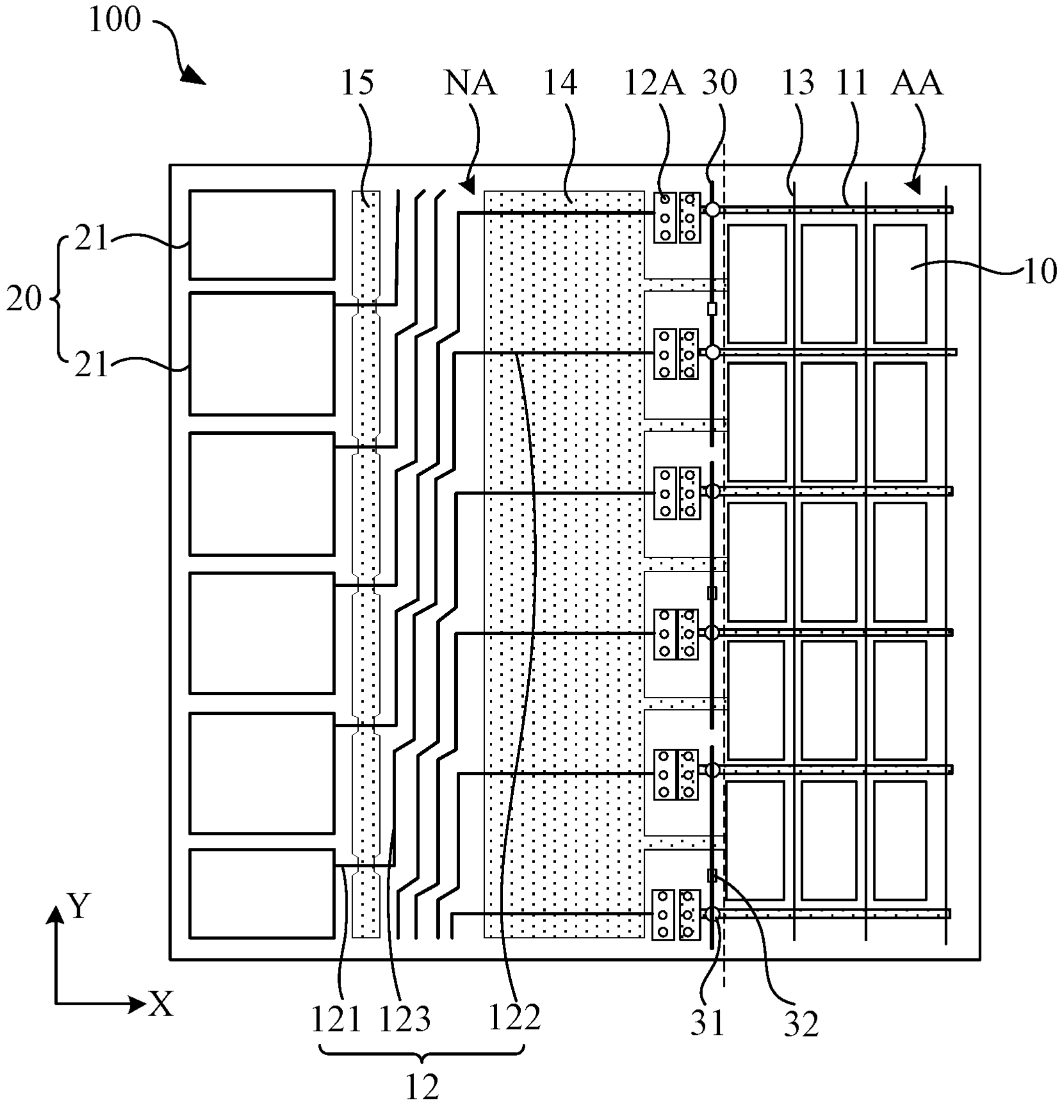
FIG. 2 is a schematic diagram of a structure of a display panel after repairing of the present application.

Specifically, please refer to FIG. 2, FIG. 2 is a schematic diagram of a structure of a display panel after repairing of the present application. As shown in FIG. 2, the repair line 30 is divided into three sections. Each section of repair line 30 connects two scan lines 11 together. With reference to FIG. 1, the cutting marks 32 are disposed between two adjacent welding marks 31. In FIG. 2, several of the cutting marks 32 have been removed as the repair line 30 are cut. It should be noted that, FIG. 2 is only an example and cannot be understood as a limitation of the application.

Wherein, the welding marks 31 may be a protrusion or a groove provided on the repair line 30. The welding mark 31 may also be a graphic mark like "−", "+", "x", and "+" disposed on the repair line 30. This application does not specifically limit this.

In the present application, when the plurality of scan lines 11 are abnormal, the repair line 30 can be cut to realize the repair of the plurality of scan lines 11, which improves the utilization rate of the repair line 30 and reduces the number of the repair line 30, and the wiring structure in the display panel 100 is simplified. Furthermore, disposing the cutting marks 32 on the repair line 30 can improve the accuracy of cutting. When the scan lines 11 are densely arranged, it is avoided that adjacent scan lines 11 are cut to cause more display defects.

In addition, the welding marks 31 and the cutting marks 32 should adopt different mark patterns or mark types to facilitate the distinction and avoid erroneous cutting.

Please continue to refer to FIG. 1, In some embodiments of the present application, the display panel 100 further provided with a plurality of via holes 12A. The via holes 12A are defined in the non-display area NA. The signal transmission lines 12 and the scan lines 11 are disposed in different layers, and each of the signal transmission lines 12 is electrically connected to corresponding scan line 11 through the via hole 12A. The repair line 30 disposed on a side of the via holes 12A close to the display area AA. The repair line 30 crosses the scan lines 11 and are disposed in different layers.

Generally, a scan signal output by the GOA circuit 20 is transmitted to the scan lines 11 via the signal transmission lines 12. The signal transmission lines 12 and the scan lines 11 are patterned and formed by different conductive metal layers. Therefore, the signal transmission lines 12 and the scan lines 11 need to be electrically connected through the via holes 12A. However, due to process problems such as process accuracy, there may be problems such as disconnection and poor contact at the via holes 12A, resulting in poor connection between the signal transmission lines 12 and the scanning lines 11, the scan signal transmission abnormal and horizontal line appearing in the display screen.

In the present application, the repair line 30 is disposed on the side of the via holes 12A close to the display area AA, no matter the GOA unit 21 has a signal output problem, or the signal transmission lines 12 has a disconnection problem, or the via hole 12A has a poor contact problem, the scan lines 11 with abnormal scan signal transmission can be repaired through the repair line 30. The wiring problems between the GOA circuit 20 and the scan lines 11 can be solved.

Further, the plurality of scan lines 11 are arranged along the first direction Y, and the repair line 30 extended along the first direction Y. Before repairing, in order to ensure that the scan lines 11 and the repair line 30 are intersected and spaced apart without electrical contact, the repair line 30 and the scan lines 11 are disposed in different layers. Wherein, the repair line 30 can be disposed in a same layer as other conductive metal film layers in the display panel 100. When the wiring space is insufficient, a metal film layer may be added to the display panel 100 to form the repair line 30.

In some embodiments of the present application, the repair line 30 and the signal transmission lines 12 are disposed in a same layer. Therefore, the manufacturing process can be simplified, and the thickness of the display panel 100 can be reduced.

In the present application, the display panel 100 further includes a common electrode line 14 and a start signal line 15. The common electrode line 14 and the start signal line 15 both disposed in the non-display area NA and located between the GOA circuit 20 and the via holes 12A. Both the common electrode line 14 and the start signal line 15 extended along the first direction Y. The start signal line 15 is connected to at least one of the GOA units 21 in the GOA circuit 20 to drive the GOA circuit 20 to work in cascade. The common electrode line 14 is used to provide a common voltage to a common electrode (not shown in the figure) of the display area AA.

wherein, the common electrode line 14, the start signal line 15 and the scan lines 11 are disposed in a same layer. The signal transmission lines 12 and the data lines 13 disposed on a same layer. Thus, the manufacturing process of the display panel 100 is simplified.

Please continue to refer to FIG. 1. In the present application, each of the signal transmission lines 12 includes a first transmission line 121, a second transmission line 122 and a third transmission line 123. A plurality of the first transmission lines 121 are arranged along the first direction Y. A plurality of the second transmission lines 122 are arranged along the first direction Y. each of the third transmission lines 123 is bent and extended along the first direction Y. Wherein, each of the first transmission lines 121 and corresponding second transmission line 122 is alternately arranged, and each of the first transmission lines 121 is electrically connected to the second transmission line 122 through corresponding third transmission line 123.

It should be understood that, for some display panels 100, when the space at the corners of the non-display area NA of the display panel 100 is insufficient for the GOA circuit 20, the GOA circuit 20 can be moved downward as a whole. In this regard, each of the GOA units 21 and corresponding scan line 11 are alternately arranged. In order to connect each of the GOA units 21 to corresponding scan line 11, the signal transmission lines 12 needs to be configured as a wiring including the first transmission line 121, the second transmission line 122 and the third transmission line 123. Thereby, the utilization rate of the wiring space of the non-display area NA of the display panel 100 is improved.

Figure 3:
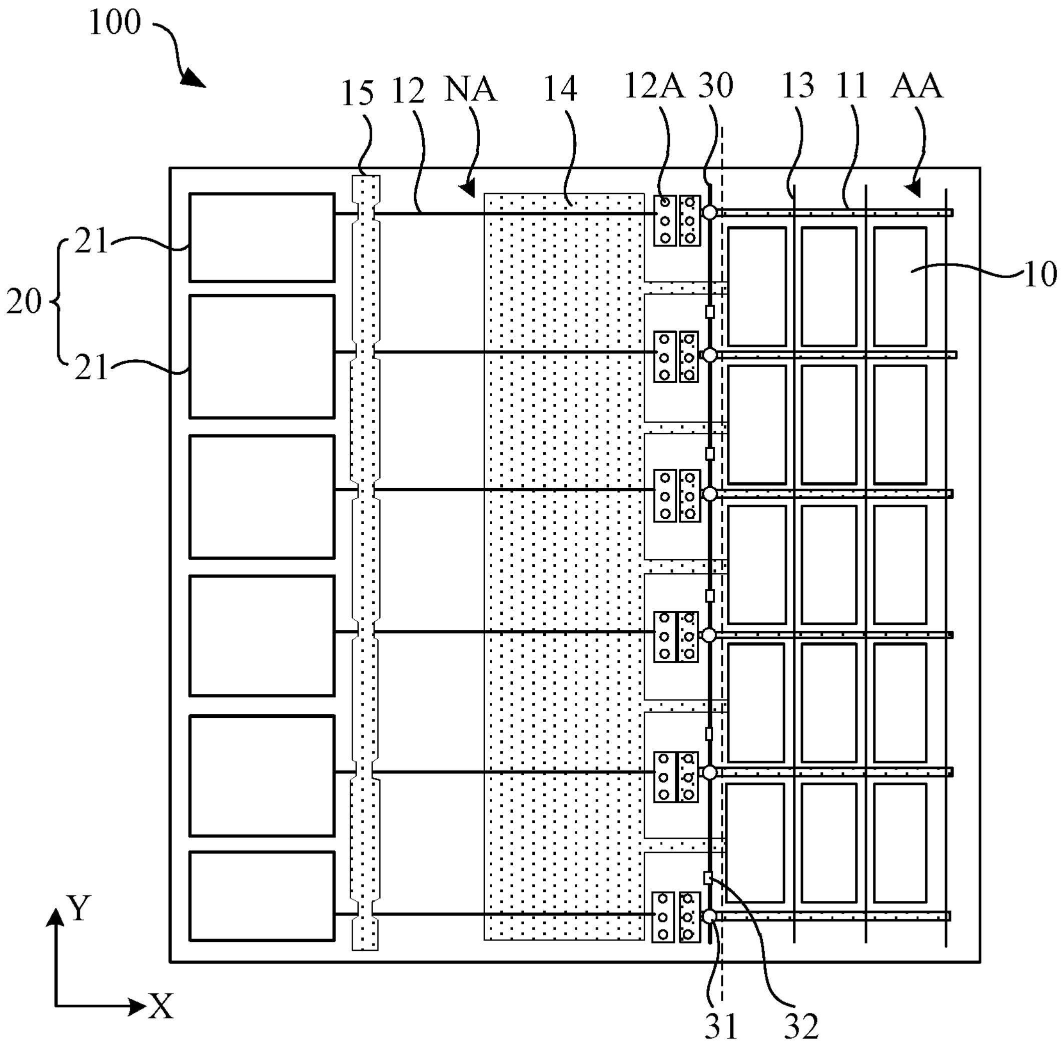
FIG. 3 is a schematic diagram of a second structure of a display panel provided by the present application.

Of course, in other embodiments of the present application, please refer to FIG. 3, FIG. 3 is a schematic diagram of a second structure of a display panel provided by the present application. A difference from the display panel 100 shown in FIG. 1 is that, in the embodiment, when the wiring space of the non-display area NA of the display panel 100 is sufficient, a plurality of signal transmission lines 12 are arranged along the first direction Y. Each of the signal transmission lines 12 extended along the second direction X. A structure of the signal transmission lines 12 is simple, so as to avoid short circuit or signal interference between the signal transmission lines 12, and at the same time reduce the wiring difficulty in the display panel 100.

Figure 4:
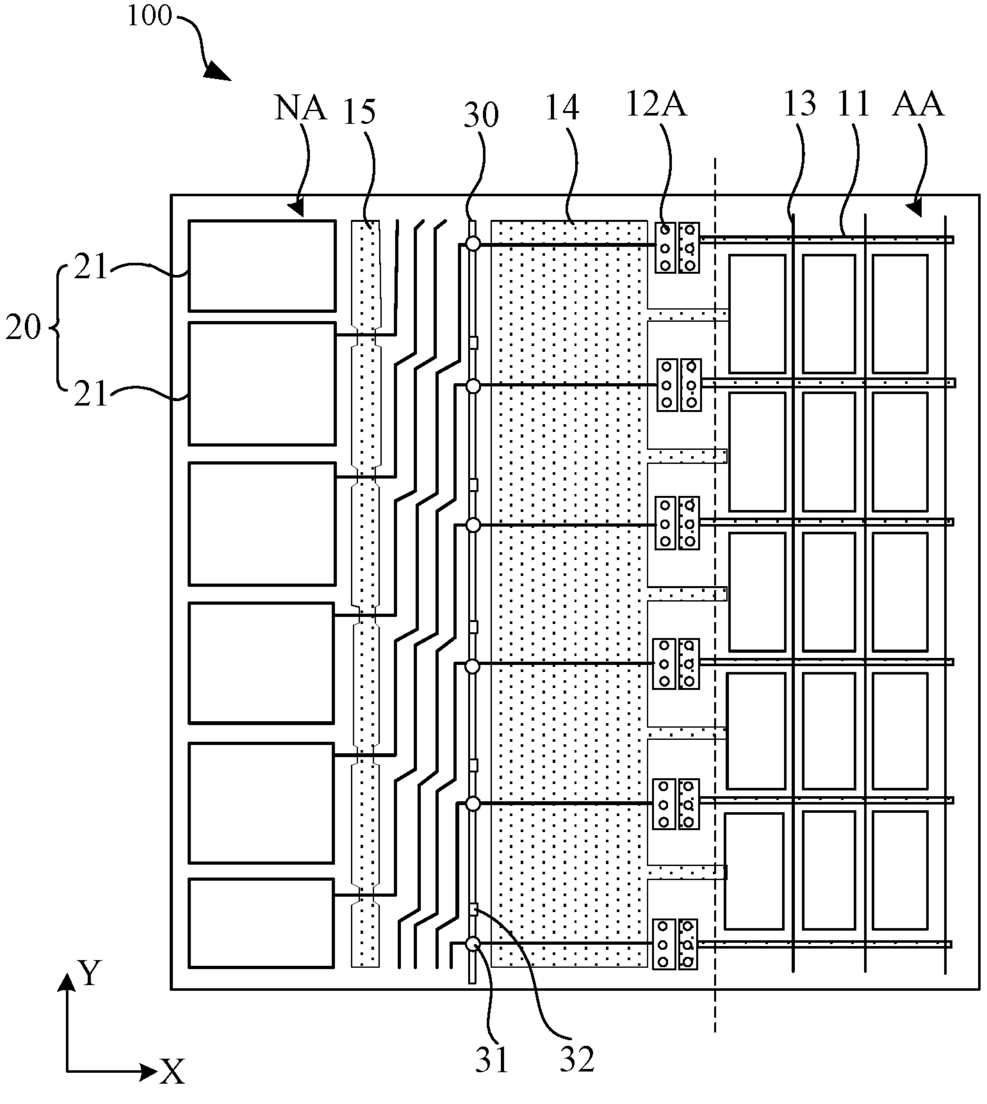
FIG. 4 is a schematic diagram of a third structure of a display panel provided by the present application.

Please refer to FIG. 4, FIG. 4 is a schematic diagram of a third structure of a display panel provided by the present application. A difference from the display panel 100 shown in FIG. 1 is that, the repair line 30 is disposed on a side of the via holes 12A away from the display area AA. The repair line 30 crosses the signal transmission lines 12 and are disposed in different layers.

Further, in the display panel 100 of the embodiment, the repair line 30 is disposed between the GOA circuit 20 and the common electrode line 14. The common electrode line 14, the repair line 30 and the scan lines 11 are disposed in a same layer.

It should be understood that the repair line 30 can be disposed at any position between the GOA circuit 20 and the scan lines 11. As shown in FIG. 1, when the repair line 30 is disposed on the side of the via holes 12A close to the display area AA, the repair line 30 can directly shorts at least two scan lines 11 together. As shown in FIG. 3, when the repair line 30 is disposed on the side of the via holes 12A away from the display area AA, the repair line 30 shorts at least two signal transmission lines 12 together, and then corresponding scan lines 11 are shorted together.

When the repair line 30 is disposed on the side of the via holes 12A away from the display area AA, before repairing, the repair line 30 needs to be crossed and separated from the signal transmission lines 12 and disposed without electrical contact, so that the repair line 30 and the signal transmission lines 12 are disposed in different layers. In the embodiment, the common electrode line 14, the repair line 30 and the scan lines 11 are disposed in the same layer, which is beneficial to reduce the thickness of the display panel 100.

Of course, when the repair line 30 is disposed on the side of the via holes 12A away from the display area AA, only when a line on a left side of the repair line 30 is broken or the output of the GOA unit 21 is wrong, and a line on a right side of the repair line 30 is normal, the scan lines 11 can be repaired. Therefore, in some embodiments of the present application, only the repair line 30 may be disposed on the side of the via holes 12A away from the display area AA and the side of the via holes 12A close to the display area AA. Thereby, the flexibility of the setting position of the repair line 30 and the efficiency of repair are improved. In addition, since the common electrode line 14 extended along the first direction Y, the repair line 30 is disposed between the GOA circuit 20 and the common electrode line 14, which can avoid the overlap of the repair line 30 and the common electrode line 14, thereby reducing display parasitic capacitance in the panel 100.

Figure 5:
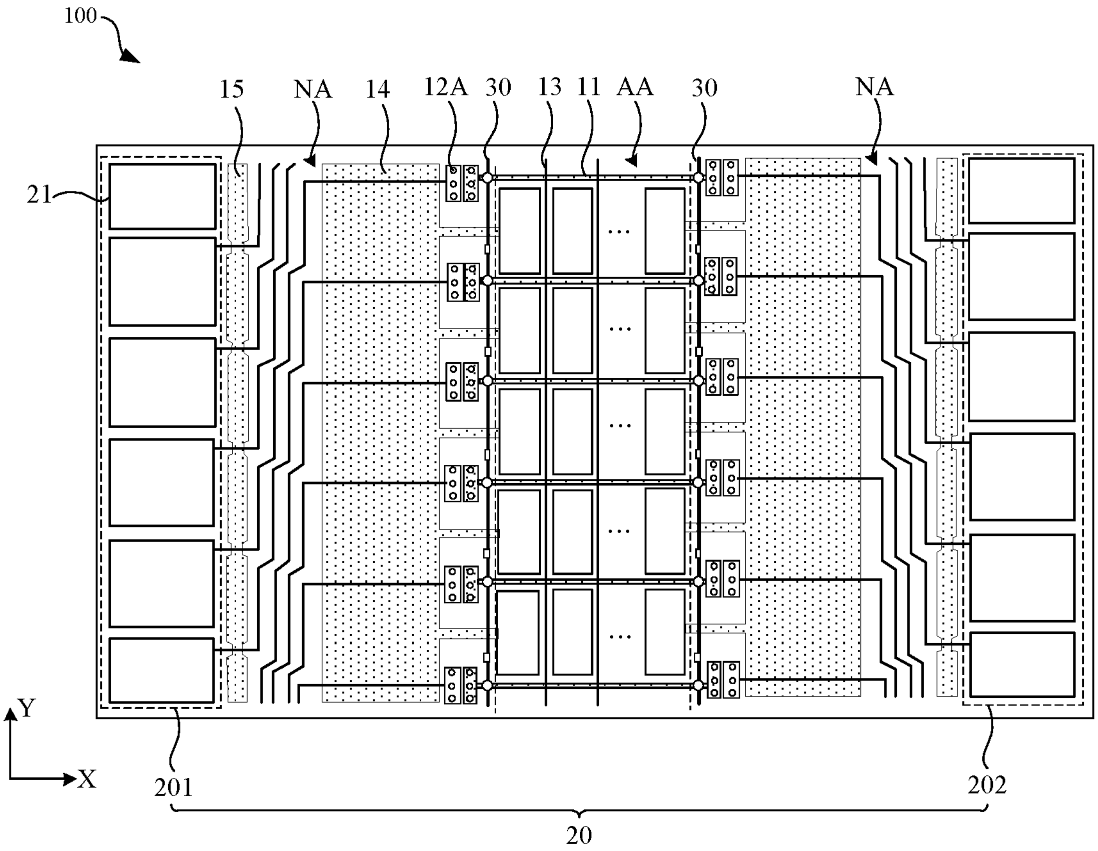
FIG. 5 is a schematic diagram of a fourth structure of a display panel provided by the present application.

Please refer to FIG. 5, FIG. 5 is a schematic diagram of a fourth structure of a display panel provided by the present application. A difference from the display panel 100 shown in FIG. 1 is that, in the embodiments of the present application, the GOA circuit 20 includes a first GOA circuit 201 and a second GOA circuit 202. The first GOA circuit 201 and the second GOA circuit 202 are disposed on opposite sides of the display area AA. A plurality of the repair line 20 is two, one of the repair lines 20 is disposed between the first GOA circuit 201 and the display area AA. Other the repair line 30 is disposed between the second GOA circuit 202 and the display area AA.

Wherein, a connection relationship between the scan lines 11, the first GOA circuit 201 and the second GOA circuit 202 can refer to the above-mentioned embodiment, which will not be repeated here.

When a size of the display panel 100 is larger, a length of the scan lines 11 along the second direction X is longer, and scan signals will be lost due to the resistance voltage drop, and the sub-pixels 10 will be undercharged. Therefore, in the embodiment, the first GOA circuit 201 and the second GOA circuit 202 are provided in the display panel 100, and a double-sided GOA drive architecture is adopted, which can effectively reduce the transmission loss of the scan signals and further improve the display image of the display panel 100.

In this regard, there may be a problem of poor connection between the scan lines 11 and the first GOA circuit 201 and the second GOA circuit 202. Therefore, the repair line 30 is disposed between the first GOA circuit 201 and the display area AA, and between the second GOA circuit 202 and the display area AA, the scan lines 11 that transmits the scan signal abnormally can be compensated to solve the problem of poor display of the display panel 100.

Of course, since each of the scan lines 11 is connected to the first GOA circuit 201 and the second GOA circuit 202 at the same time, only one of the repair lines 30 can also be disposed to simplify the process and repair process.

Figure 6:
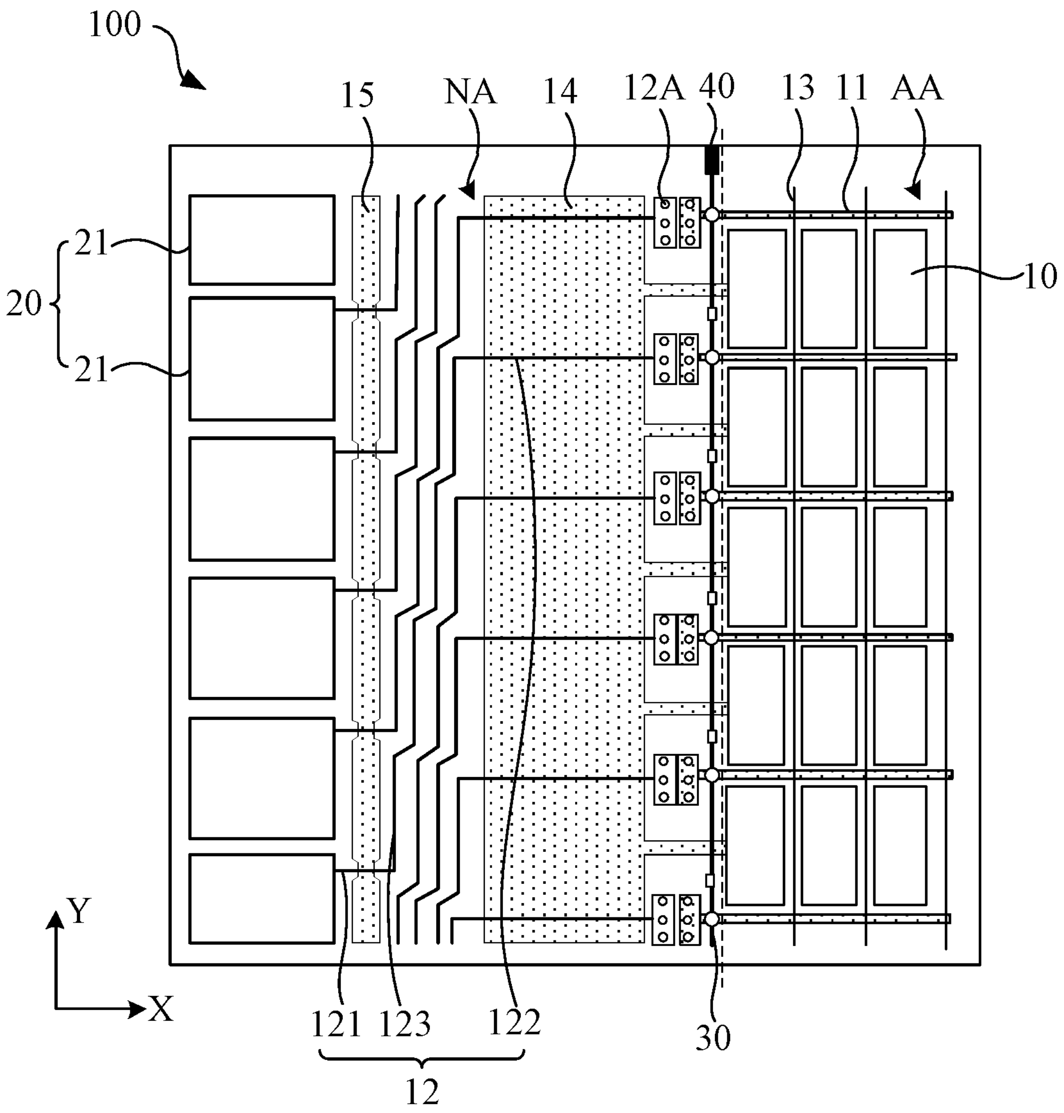
FIG. 6 is a schematic diagram of a fifth structure of a display panel provided by the present application.

Please refer to FIG. 6, FIG. 6 is a schematic diagram of a fifth structure of a display panel provided by the present application. A difference from the display panel 100 shown in FIG. 1 is that, in the embodiments, the display panel 100 further includes a detection pad 40. One end of the repair line 30 is electrically connected to the detection pad 40.

That is, the repair line 30 can be multiplexed as a detection line to detect a multi-level scan signal output by the GOA circuit 20, and then evaluate the GOA circuit 20. For example, it is usually necessary to perform a high temperature and high humidity test on the display panel 100 for 500 hours or even longer, which will make the output of the GOA circuit 20 worse. By testing the output scan signal, analyze and determine how the scan signal becomes worse, so as to adjust the transistors in the GOA circuit 20 according to the output waveform of the scan signals.

Specifically, for example, in the GOA circuit 20 of the reverse stage transmission, the repair line 30 is connected to corresponding scan line 11 by successively shorting from the low end (that is, starting from the first stage GOA unit 21), it is used to detect the scan signal output by the GOA units 21 of different levels and the scan signals corresponding to the output clock signals of the same level. After detecting one of the scan signals, the repair line 30 can be cut off. Then connect the repair line 30 to the scan lines 11 corresponding to a next-level GOA unit 21, and continue the detection. Repeatedly, completing the acquisition of the scan signals that needs to be detected.

In the embodiment, the repair line 30 is led to the outside of the display panel 100 through the detection pad 40. Then, a detection circuit (not shown in the figure) is disposed outside the display panel 100. The repair line 30 is used to transmit the scan signals transmitted by the scan lines 11 to the detection circuit, and then corresponding scan signals is tested, and the research on the scan signals output by the GOA circuit 20 can be realized.

In some embodiments of the present application, a plurality of the repair line 30 is two. One end of the repair line 30 is electrically connected to the detection pad 40, and the other end of the repair line 30 is in a floating state. Both ends of other repair line 30 are in a floating state. That is, one of the repair lines 30 is configured to electrically connect any one of the scan lines 11 that transmits the scan signals abnormally to other the scan lines 11 that transmits the scan signals normally. The other repair line 30 is configured to electrically connect any one of the scan lines 11 to the detection pad 40.

It should be understood that when there are a plurality of scan lines 11 that transmit abnormal scan signals in the display panel 100, the repair line 30 may be cut into multiple segments to repair the plurality of scan lines 11, which inconvenient to perform the scan signals detection. Therefore, in the embodiment, two repair lines 30 are provided, and one of the repair lines 30 can only be used to repair the scan lines 11. The other repair line 30 is only used to detect the scan signals. In this way, crosstalk of the signal on the repair line 30 is avoided, and the detection accuracy is improved.

Accordingly, the present application also provides a display device, which includes a display panel and a timing controller. The timing controller is electrically connected with the display panel. The display panel is the display panel of any of the above embodiments. For details, please refer to the above embodiments and will not be repeated here.

In the present application, the display device can be a smart phone, tablet computer, video player, personal computer (PC), which is not limited in the present application.

Figure 7:
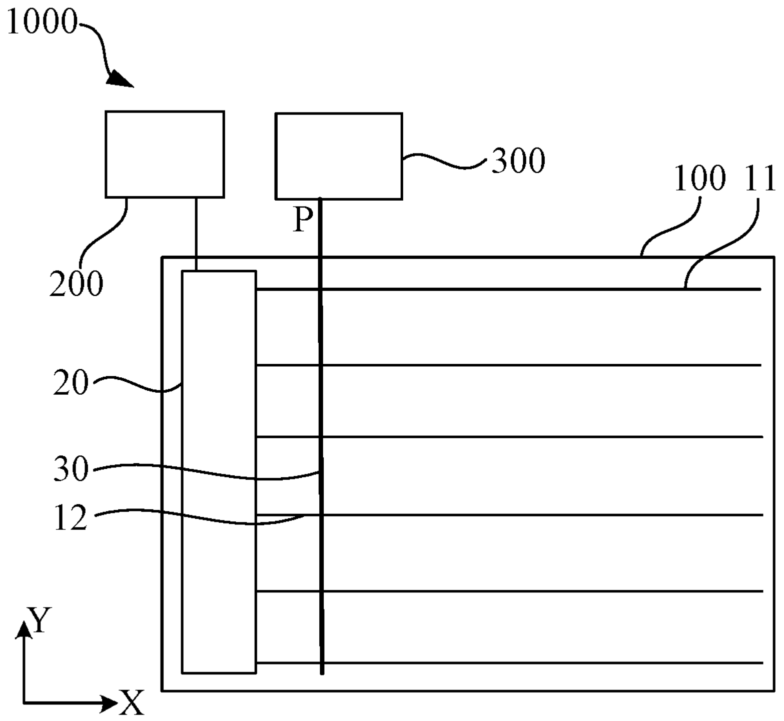
FIG. 7 is a schematic diagram of a structure of a display device provided by the present application.

Specifically, FIG. 7 is a schematic diagram of a structure of a display device provided by the present application. The display device 1000 includes a display panel 100 and a timing controller 200. The display panel 100 includes a GOA circuit 20. The timing controller 200 is used to provide a control signal to the GOA circuit 20.

The display panel 100 includes a plurality of scan lines 11, a plurality of data lines 13 and a plurality of signal transmission lines 12. The plurality of scan lines 11 are arranged in the first direction Y. The plurality of data lines 13 are arranged in the second direction X. The GOA circuit 20 is connected to corresponding scan line 11 through the signal transmission line 12. The display panel 100 also includes a plurality of sub-pixels (not shown in the figure), each of the sub-pixels is electrically connected with corresponding scan lines 11 and data line 13. The repair line 30 is disposed between the GOA circuit 20 and the scan lines 11.

Wherein, the timing controller 200 may generate a control signal for controlling the GOA circuit 20 in response to an externally received control signals. For example, the control signals may include a clock signal, a vertical synchronization signal, and a horizontal synchronization signal. The GOA circuit 20 outputs a multi-stage scan signal to corresponding scan line 11 under the action of the control signal.

In the display device 1000 provided by the present application, by adding the repair line 30 in the display panel 100, when any one of the scan lines 11 transmits a scan signal abnormally, the repair line 30 is used to electrically connect the scan lines 11 with abnormal transmission scan signals with another scan line 11 with normal transmission scan signals, so that the scan lines 11 with abnormal transmission scan signals can receive a normal scan signal. Thus, the horizontal line caused by the poor connection between the GOA circuit 20 and the scan lines 11 is repaired, the problem of poor display of the display panel 100 is improved, and the quality of the display device 1000 is improved.

Further, in some embodiments of the present application, the display device 1000 also includes a circuit board 300. The circuit board 300 includes a detection pin P. The repair line 30 extended to the outside of the display panel 100 and is electrically connected to the detection pin P.

Among them, the circuit board 300 may be connected to the display panel 100 through chip on film (COF). The circuit board 300 may be an XB board or a CB board (control board). The circuit board 300 can detect the scan signals transmitted by the repair line 30 through the detection pin P, and then study the scan signals at all levels output by the GOA circuit 20. Specifically, the method of transmitting the scan signals by the repair line 30 can refer to the above embodiment and will not be repeated here.

The present application has been described by the relevant embodiments, however, the above embodiments are only examples of the implementation of the present invention. It must be noted that the disclosed embodiments do not limit the scope of the present invention. On the contrary, the modification and equalization of the spirit and scope included in the claims are included in the scope of the invention.

What is claimed is:

1. A display panel, comprising a display area and a non-display area connected to the display area, wherein the display panel comprises:

a plurality of scan lines disposed in the display area and extended to the non-display area, wherein the plurality of scan lines are arranged along a first direction;

a GOA circuit disposed in the non-display area, wherein the GOA circuit comprises multi-stage cascaded GOA units;

a plurality of signal transmission lines disposed in the non-display area, wherein each of the GOA units is electrically connected to at least one of the plurality of scan lines through corresponding one of the plurality of signal transmission lines;

at least one repair line disposed between the GOA circuit and the display area and extended along the first direction, wherein the at least one repair line crosses the plurality of scan lines or the plurality of signal transmission lines and is disposed in different layers; and wherein the at least one repair line is configured to electrically connect one scan line of the plurality of scan lines that transmits a first scan signal abnormally to another scan line of the plurality of scan lines that transmits a second scan signal normally, such that the scan line that transmits the first scan signal abnormally and the scan line that transmits the second scan signal normally transmit the second scan signal simultaneously.

2. The display panel according to claim 1, wherein the display panel further provides with a plurality of via holes, the plurality of via holes are defined in the non-display area, the plurality of signal transmission lines and the plurality of scan lines are disposed in different layers, and each of the plurality of signal transmission lines is electrically connected to corresponding scan line through one of the plurality of via holes; and wherein the at least one repair line is disposed on a side of the plurality of via holes close to the display area, and the at least one repair line crosses the plurality of scan lines and are disposed in different layers.

3. The display panel according to claim 2, wherein the at least one repair line and the plurality of signal transmission lines are disposed in a same layer.

4. The display panel according to claim 1, wherein the at least one repair line is provided with a plurality of welding marks, and intersections of the plurality of scan lines and the at least one repair line correspond one-to-one with the plurality of welding marks.

5. The display panel according to claim 4, wherein a quantity of the at least one repair line is one, a plurality of cutting marks are disposed on the repair line, and one of the plurality of cutting marks is disposed between every two adjacent welding marks.

6. The display panel according to claim 1, wherein the display panel further provides with a plurality of via holes, the plurality of via holes are defined in the non-display area, the plurality of signal transmission lines and the plurality of scan lines are disposed in different layers, and each of the plurality of signal transmission lines is electrically connected to corresponding scan line through one of the plurality of via holes; and wherein the at least one repair line is disposed on a side of the plurality of via holes away from the display area, and the at least one repair line crosses the plurality of signal transmission lines and is disposed in different layers.

7. The display panel according to claim 6, wherein the display panel further comprises a common electrode line, the common electrode line extended along the first direction and is disposed between the GOA circuit and the plurality of via holes, and the at least one repair line is disposed between the GOA circuit and the common electrode line;

wherein the common electrode line, the at least one repair line and the plurality of scan lines are disposed in a same layer.

8. The display panel according to claim 1, wherein the display panel further comprises a detection pad, a quantity of the at least one repair line is one, and one end of the repair line is electrically connected to the detection pad.

9. The display panel according to claim 1, wherein the display panel further comprises a detection pad, a quantity of the at least one repair line is two, one end of one of the two repair lines is electrically connected to the detection pad, and both ends of other repair line are in a floating state.

10. The display panel according to claim 1, wherein each of the plurality of signal transmission lines comprises a first transmission line, a second transmission line and a third transmission line, a plurality of the first transmission lines are arranged along the first direction, and a plurality of the second transmission lines are arranged along the first direction, each of the third transmission lines is bent and extended along the first direction;

wherein, each of the plurality of first transmission lines and corresponding second transmission line is alternately arranged, and each of the plurality of first transmission lines is electrically connected to the second transmission line through corresponding third transmission line.

11. The display panel according to claim 1, wherein the GOA circuit comprises a first GOA circuit and a second GOA circuit, the first GOA circuit and the second GOA circuit are disposed on opposite sides of the display area;

a quantity of the at least one repair line is two, one of the two repair lines is disposed between the first GOA circuit and the display area, and other repair line is disposed between the second GOA circuit and the display area.

12. A display device comprising a display panel and a timing controller, the timing controller is electrically connected to the display panel, wherein the display panel comprises:

a plurality of scan lines disposed in the display area and extended to the non-display area, wherein the plurality of scan lines are arranged along a first direction;

a GOA circuit disposed in the non-display area, wherein the GOA circuit comprises multi-stage cascaded GOA units;

a plurality of signal transmission lines disposed in the non-display area, wherein each of the GOA units is electrically connected to at least one of the plurality of scan lines through corresponding one of the plurality of signal transmission lines;

at least one repair line disposed between the GOA circuit and the display area, and extended along the first direction, wherein the at least one repair line crosses the plurality of scan lines or the plurality of signal transmission lines and is disposed in different layers;

the timing controller used to provide control signals to the GOA circuit; and wherein the at least one repair line is configured to electrically connect one scan line of the plurality of scan lines that transmits a first scan signal abnormally to another scan line of the plurality of scan lines that transmits a second scan signal normally, such that the scan line that transmits the first scan signal abnormally and the scan line that transmits the second scan signal normally transmit the second scan signal simultaneously.

13. The display device according to claim 12, wherein the display device further comprises a circuit board, the circuit board has a detection pin, wherein the detection pin is electrically connected to the at least one repair line.

14. The display device according to claim 12, wherein the display panel further provides with a plurality of via holes, the plurality of via holes are defined in the non-display area, the plurality of signal transmission lines and the plurality of scan lines are disposed in different layers, and each of the plurality of signal transmission lines is electrically connected to corresponding scan line through one of the plurality of via holes;

wherein the at least one repair line is disposed on a side of the plurality of via holes close to the display area, and the at least one repair line crosses the plurality of scan lines and is disposed in different layers.

15. The display device according to claim 12, wherein the at least one repair line is disposed with a plurality of welding marks, and intersections of a plurality of the scan lines and the at least one repair line correspond one-to-one with the plurality of welding marks.

16. The display device according to claim 15, wherein a quantity of the at least one repair line is one, a plurality of cutting marks are disposed on the repair line, and one of the plurality of cutting marks is disposed between every two adjacent welding marks.

17. The display device according to claim 12, wherein the display panel further provides with a plurality of via holes, the plurality of via holes are defined in the non-display area, the plurality of signal transmission lines and the plurality of scan lines are disposed in different layers, and each of the plurality of signal transmission lines is electrically connected to corresponding scan line through one of the plurality of via holes; and wherein the at least one repair line is disposed on a side of the plurality of via holes away from the display area, and the at least one repair line crosses the plurality of signal transmission lines s and is disposed in different layers.

18. The display device according to claim 17, wherein the display panel further comprises a common electrode line, the common electrode line extends along the first direction and is disposed between the GOA circuit and the plurality of via holes, and the at least one repair line is disposed between the GOA circuit and the common electrode line;

wherein, the common electrode line, the at least one repair line and the plurality of scan lines are disposed in the same layer.

19. The display device according to claim 12, wherein the display panel further comprises a detection pad, a quantity of the at least one repair line is one, and one end of the repair line is electrically connected to the detection pad.

20. The display device according to claim 12, wherein the display panel further comprises a detection pad, a quantity of the at least one repair line is two, one end of one of the two repair lines is electrically connected to the detection pad, and both ends of other repair line are in a floating state.

* * * * *